(12) United States Patent
Shoda

(10) Patent No.: US 12,159,006 B2
(45) Date of Patent: Dec. 3, 2024

(54) IMAGE PROCESSING APPARATUS, IMAGE CAPTURING APPARATUS, AND CONTROL METHOD OF IMAGE PROCESSING APPARATUS

(71) Applicant: CANON KABUSHIKI KAISHA, Tokyo (JP)

(72) Inventor: Satoshi Shoda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/589,669

(22) Filed: Jan. 31, 2022

(65) Prior Publication Data

US 2022/0244849 A1  Aug. 4, 2022

(30) Foreign Application Priority Data

Feb. 1, 2021  (JP) ................ 2021-014184

(51) Int. Cl.
*G06F 3/041* (2006.01)
*G06F 3/01* (2006.01)
*G06F 3/03* (2006.01)
*G06F 3/042* (2006.01)
*G06F 3/04815* (2022.01)

(52) U.S. Cl.
CPC ........ *G06F 3/041661* (2019.05); *G06F 3/011* (2013.01); *G06F 3/0304* (2013.01); *G06F 3/0428* (2013.01); *G06F 3/04815* (2013.01)

(58) Field of Classification Search
CPC .... G06F 3/041661; G06F 3/011; G06F 3/016; G06F 3/017; G06F 3/0428; G06F 3/0304; G06F 3/04815; G09G 2340/12; G09G 5/377; G06T 19/006; H04N 23/73; H04N 23/673; H04N 23/75
See application file for complete search history.

(56) References Cited

U.S. PATENT DOCUMENTS

| 9,373,195 | B2 * | 6/2016 | Kasahara | G06F 16/583 |
| 9,826,142 | B2 * | 11/2017 | Shoda | H04N 19/85 |
| 10,198,867 | B2 * | 2/2019 | Kasahara | G06T 19/006 |
| 10,380,950 | B2 * | 8/2019 | Chang | G06F 3/013 |
| 10,412,295 | B2 * | 9/2019 | Hamano | H04N 5/232122 |
| 10,841,555 | B2 * | 11/2020 | Taya | H04N 23/73 |
| 11,589,023 | B2 * | 2/2023 | Taya | H04N 13/111 |
| 2018/0090078 | A1 * | 3/2018 | Chang | G09G 3/003 |
| 2019/0342537 | A1 * | 11/2019 | Taya | G06T 15/20 |
| 2020/0042105 | A1 * | 2/2020 | Tanaka | G06F 3/0487 |
| 2021/0029338 | A1 * | 1/2021 | Taya | H04N 23/80 |

FOREIGN PATENT DOCUMENTS

JP  2010245774 A  10/2010
JP  2018028572 A  2/2018

\* cited by examiner

*Primary Examiner* — Vijay Shankar
(74) *Attorney, Agent, or Firm* — Canon U.S.A., Inc. IP Division

(57) ABSTRACT

A CPU of an image capturing apparatus acquires a motion amount of a target including a virtual object and performs exposure control based on the acquired motion amount. The CPU captures an image of a real space using the exposure control. The CPU combines the captured image of the real space with an image of the virtual object to generate a mixed reality image.

15 Claims, 8 Drawing Sheets

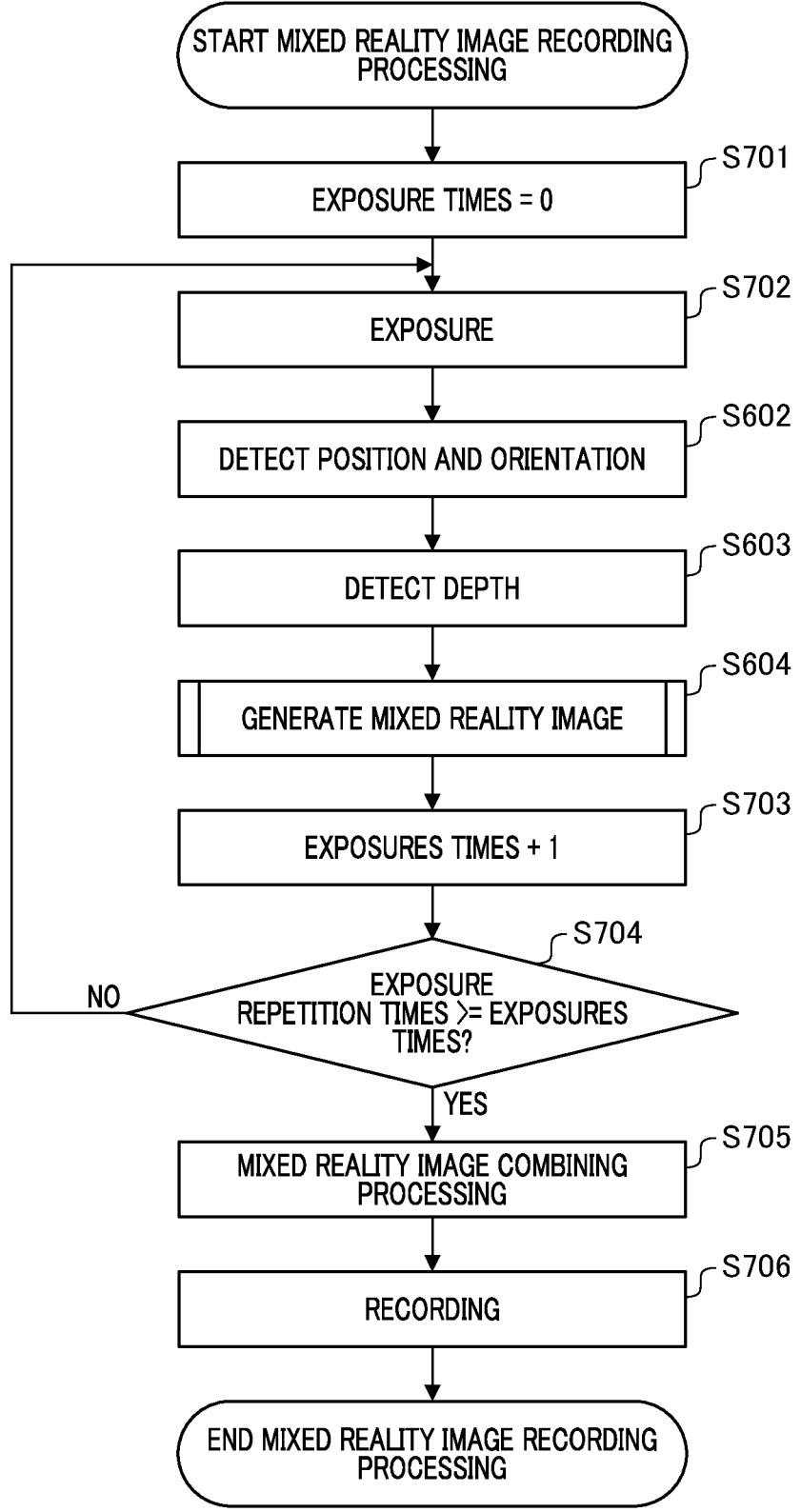

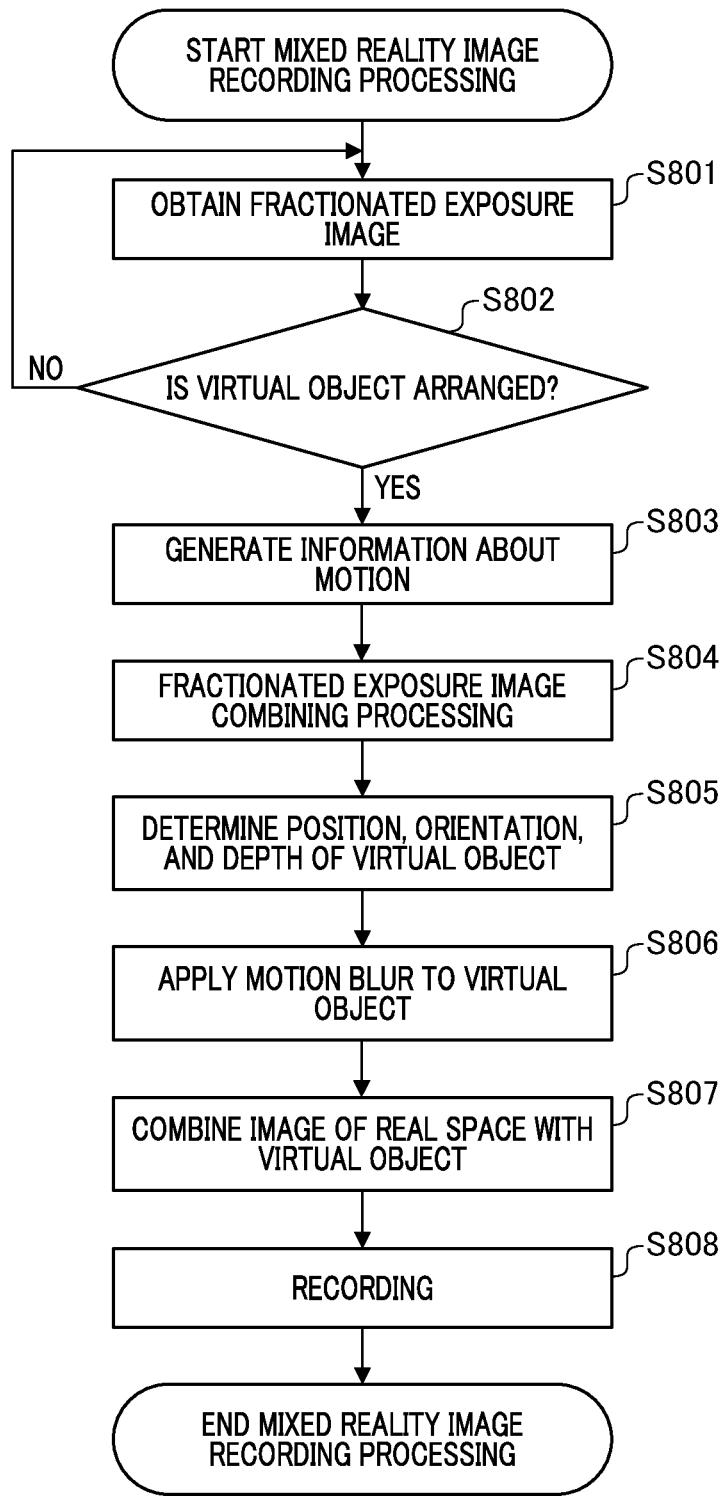

IMAGE PROCESSING APPARATUS, IMAGE CAPTURING APPARATUS, AND CONTROL METHOD OF IMAGE PROCESSING APPARATUS

BACKGROUND

Field of the Disclosure

The present disclosure relates to an image processing apparatus, an image capturing apparatus, and a control method of the image processing apparatus.

Description of the Related Art

An image capturing apparatus capable of changing an exposure time during shooting is proposed. During an exposure period of time, bluffing appears on an image due to the motion of the image capturing apparatus and the motion of an object. Although the image blur may become one of the causes of image quality deterioration due to the lowering of the perceived resolution, it can express speed and a feeling of liveliness. Accordingly, a shooting technique, for example, a panning shot that intentionally causes image blur, is sometimes used. Japanese Patent Application Laid-Open No. 2010-245774 discloses an electronic camera that determines an exposure time used for shooting based on a moving amount of an object in order to obtain a panning shot image. In contrast, the MR (Mixed Reality) technique, which presents a mixed reality image in which a virtual object is superimposed on a real space is known. Japanese Patent Application Laid-Open No. 2018-28572 discloses an image processing apparatus that changes the characteristics of a blur filter to be applied to a virtual object according to a motion vector and an image capturing parameter when a real image is shot.

The electronic camera disclosed in Japanese Patent Application Laid-Open No. 2010-245774 cannot perform exposure control in consideration of the motion of a virtual object that does not exist in a real space. Additionally, since the image processing apparatus disclosed in Japanese Patent Application Laid-Open No. 2018-28572 also does not perform processing in consideration of the motion of the virtual object, it is not possible to generate a mixed reality image with a decreased sense of incongruity in which the motion of the virtual object is reflected.

SUMMARY

The present disclosure provides an image processing apparatus capable of generating a mixed reality image with a decreased sense of incongruity in which the motion of the virtual object is reflected.

An image processing apparatus according to an embodiment of the present disclosure has an acquisition unit configured to acquire a motion amount of a target including a virtual object; a controller configured to perform exposure control based on a photometry result and the acquired motion amount; and a generation unit configured to generate a combined image by combining an image of a real space captured by the exposure control and an image of the virtual object.

Further features of the present disclosure will become apparent from the following description of exemplary embodiments with reference to the attached drawings.

BRIEF DESCRIPTION OF THE DRAWINGS

FIG. 7 is a flowchart that explains an example of the recording processing of the mixed reality image.

FIG. 8 is a flowchart that explains an example of the recording processing of the mixed reality image.

DESCRIPTION OF THE EMBODIMENTS

First Embodiment

Figure 1:
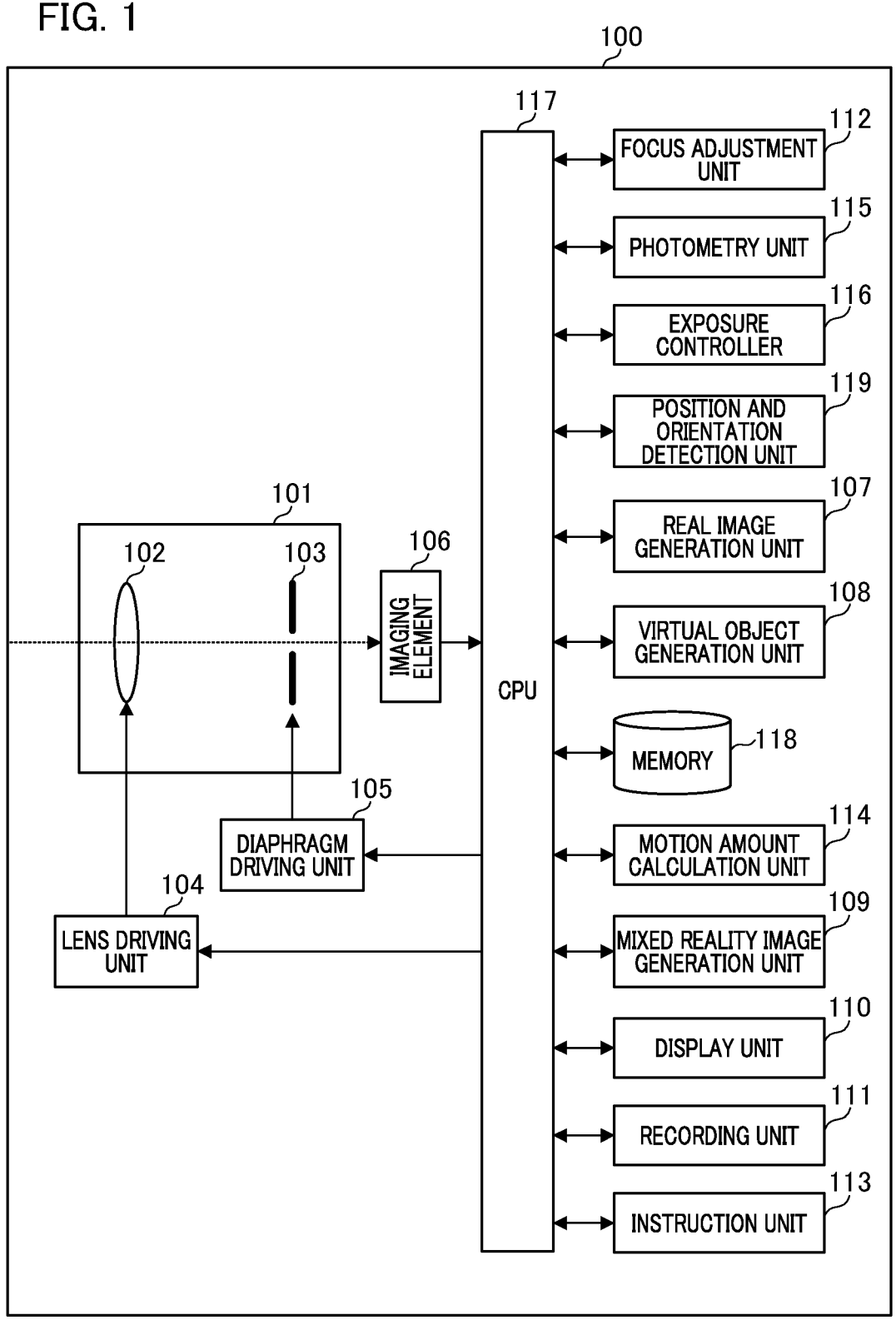
FIG. 1 illustrates a configuration example of an image processing apparatus.

FIG. 1 illustrates a configuration example of an image processing apparatus according to the present embodiment. In FIG. 1, a configuration of an image capturing apparatus 100 will be described to serve as an example of the image processing apparatus. The image capturing apparatus 100 has components from an image-formation optical system 101 to a position and orientation detection unit 119. The image-formation optical system 101 guides object light to an imaging element 106. The image-formation optical system 101 has a focusing lens 102, a diaphragm 103, and a lens group (not illustrated). A lens driving unit 104 drives and controls the focusing lens 102 and the lens group (not illustrated) of the image-formation optical system 101. The focusing lens 102 is driven in a direction along the optical axis according to a drive control signal from the lens driving unit 104.

A diaphragm driving unit 105 drives and controls the diaphragm 103. The diaphragm 103 is driven to have a predetermined aperture diameter according to a drive control signal from the diaphragm drive unit 105 to adjust an amount of light. The imaging element 106 photoelectrically converts a received light beam and outputs a signal for a captured image. The imaging element 106 has a pixel array in which unit pixels are two-dimensionally arranged. A signal group output from the imaging element 106 is stored in a storage region (not illustrated) and transferred to various processing units via a CPU (Central Processing Unit) 117.

The CPU 117 controls the operation for the entire image capturing apparatus 100. For example, the CPU 117 performs flow control for the overall shooting by the image capturing apparatus 100, and issues instructions to the lens driving unit 104, the diaphragm driving unit 105, and the like. A focus adjustment unit 112 performs defocus calculation based on a signal for a captured image, converts the result of the defocus calculation into a lens driving amount, and issues a lens driving signal.

An instruction unit 113 is an operation unit used for operation input by the user. The instruction unit 113 is, for example, a physical switch configured in the body of the image capturing apparatus 100 and is used for switching imaging modes, specifying the focus detection position during autofocus, instructing shooting preparation, instructing a shooting start, and the like. For example, when a release switch of the instruction unit 113 is pressed halfway (SW1 is ON), a signal indicating that shooting preparation has been instructed is output. When the release switch is pressed completely (SW2 is ON), a signal indicating that a shooting start has been instructed is output. The instruction unit 113 may have a touch panel that is built into a display unit 110.

A photometry unit 115 measures the brightness of an object in a real space. The position and orientation detection unit 119 detects position and orientation information indicating the position and orientation of the image capturing apparatus 100. A motion amount calculation unit 114 calculates (acquires) a motion amount of a target including a virtual object. The target including a virtual object is an object and a virtual object. An exposure controller 116 executes exposure control based on the photometry result of the photometry unit 115 and the amount of motion calculated by the motion amount calculation unit 114. In this example, the exposure controller 116 sets exposure conditions such as the shutter speed and the aperture value, based on the amount of motion of the target including the virtual object. Thus, the exposure time according to the set exposure conditions is determined.

A real image generation unit 107 performs development processing on a signal group that is output from the imaging element 106 and generates an image of the real space. A virtual object generation unit 108 generates a virtual object model (an object of the virtual object) to be superimposed on the image of the real space, based on a virtual object model that has been stored in a memory 118 in advance. A mixed reality image generation unit 109 combines the image of the real space with the image pertaining to the virtual object model (the image of the virtual object) to generate a mixed reality image, which is a combined image. In this example, the mixed reality image generation unit 109 renders the virtual object model that has been generated by the virtual object generation unit 108 by superimposing it on the image of the real space. The virtual object model is stored in the memory 118 in advance. The virtual object model is four-dimensional data having three-dimensional space information and one-dimensional time information. A control program executed by the CPU 117 is stored in the memory 118 in advance.

The display unit 110 performs, for example, live view display of a captured image, display of a shooting setting screen, and display of a reproduced image. The display unit 110 is, for example, a display device having a liquid crystal display and the like. A recording unit 111 is a storage medium, for example, an SD card, and records the mixed reality image that is generated by the mixed reality image generation unit 109.

Figure 2:
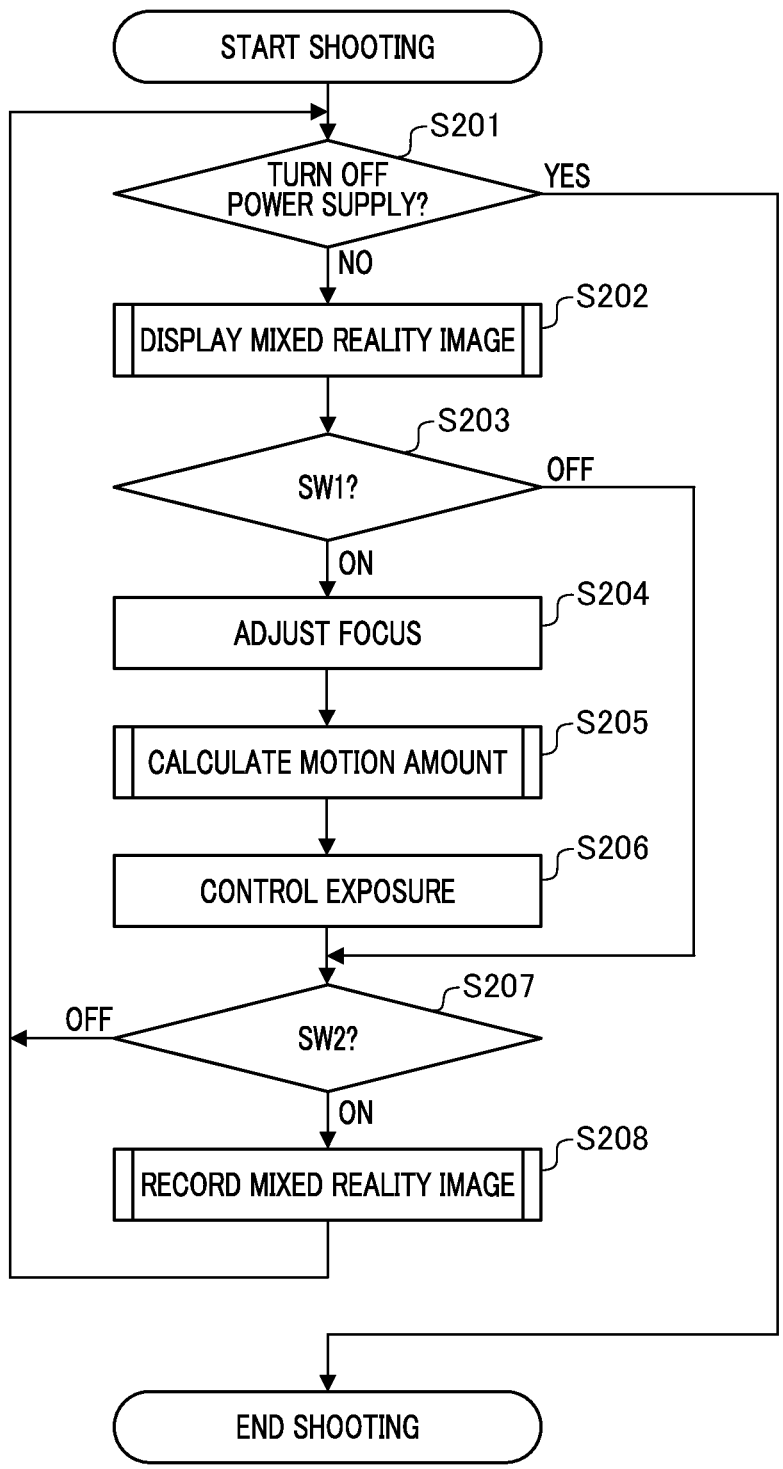
FIG. 2 is a flowchart that explains an example of a shooting operation for a mixed reality space.

FIG. 2 is a flowchart that explains an example of the shooting operation of the mixed reality space by the image capturing apparatus. Each process according to this flowchart is realized by the CPU 117 executing a control program stored in the memory 118. In FIG. 2, the symbol "S" indicates a step number corresponding to each process according to this flowchart.

When shooting starts, the process proceeds to S201. In S201, the CPU 117 determines whether or not a power supply is turned OFF. If the power supply is not turned OFF, the process proceeds to S202. When the power supply is turned OFF, the shooting process ends. In S202, the CPU 117 performs display processing of the mixed reality image (live view display). Details of the display processing of the mixed reality image will be described below.

Next, in S203, the CPU 117 determines whether or not the SW1 is turned ON. When the SW1 is not turned ON but is turned OFF, the process proceeds to S207. If the SW1 is turned ON, the process proceeds to S204. Subsequently, the CPU 117 controls the focus adjustment unit 112 to perform the focus adjustment processing. The CPU 117 drives the focusing lens 102 so as to focus on an arbitrary object including a virtual object existing in a focus detection region set in advance, based on the output from the focus adjustment unit 112. Subsequently, in S205, the CPU 117 controls the motion amount calculation unit 114 so as to calculate a motion amount of a target including the virtual object.

Figure 3:
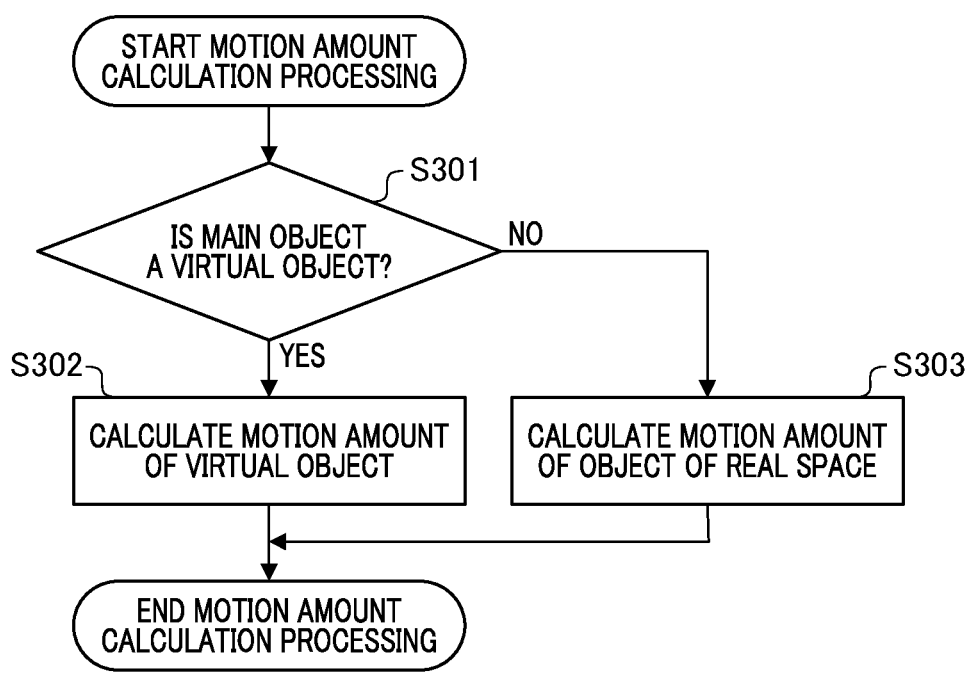
FIG. 3 is a flowchart that explains an example of the motion amount calculation processing.

FIG. 3 is a flowchart that explains an example of the motion amount calculation processing in S205 in FIG. 2. Each process according to this flowchart is realized by the CPU 117 executing a control program stored in the memory 118. In FIG. 3, the symbol "S" indicates a step number corresponding to each process according to this flowchart.

In S301, the motion amount calculation unit 114 determines whether or not a main target to be shot in the mixed reality space (referred to as the "main object" for convenience) is a virtual object. Specifically, a region that is focused on by the focus adjustment processing is defined as a main object region, and when a virtual object is superimposed on the main object region, the main object is determined to be a virtual object. When the virtual object is not superimposed on the main object region, the main object is determined to be an object in the real space, not a virtual object.

If the motion amount calculation unit 114 determines that the main object is not a virtual object, the process proceeds to S303. If the motion amount calculation unit 114 determines that the main object is a virtual object, the process proceeds to S302. In S303, the motion amount calculation unit 114 calculates a motion amount of the object in the real space. Specifically, the motion amount calculation unit 114 calculates a motion vector to serve as a motion amount based on the displacement of the feature point of the object between the two images, based on a signal for the captured image output from the imaging element 106.

In S302, the motion amount calculation unit 114 calculates a motion amount of the virtual object. The virtual objects at each position in the time axis direction shown by the virtual object model stored in the memory 118 can be defined in different space coordinates, and a moving amount of the virtual object on the coordinates between the positions in the time axis direction can be treated as the motion amount. When the superimposing position of the virtual object in the mixed reality space and the time period during which the motion is detected are already known, a motion vector obtained by projecting the motion amount of the virtual object in a predetermined time period on the two-dimensional coordinates of the mixed reality image can be calculated. Hence, the motion amount calculation unit 114 refers to the virtual object model stored in the memory 118, acquires information about the virtual object model superimposed on the main object region, and calculates a motion amount of the virtual object based on the information about the acquired virtual object model and the time period during which the motion is detected. When the motion vector is calculated in S302 and S303, the calculation processing of the motion amount ends.

The description will now return to FIG. 2. In S206, the exposure controller 116 performs exposure control based on the photometry result of the photometry unit 115 and the motion amount of the target including the virtual object calculated by the motion amount calculation unit 114. Specifically, the exposure controller 116 determines an appropriate EV value based on the photometry result and determines a shutter speed and an aperture value in the appropriate EV value. The exposure controller 116 sets exposure conditions so that the image blur caused by the motion of a target including a virtual object is minimized based on the motion amount output from the motion amount calculation unit 114. For example, as the amount of motion increases, the exposure controller 116 increases the shutter speed and decreases the stop value (increases the aperture diameter). Therefore, an exposure time according to the set exposure conditions is determined.

Next, in S207, the CPU 117 determines whether or not the SW2 is turned ON. If the SW2 is not turned ON but is turned OFF, the process returns to S201. If the SW2 is turned ON, the process proceeds to S208. Subsequently, in S208, the CPU 117 performs recording processing of the mixed reality image. Details of the recording processing of the mixed reality image will be described below. After the recording processing of the mixed reality image has been completed, the process returns to S201.

Figure 4:
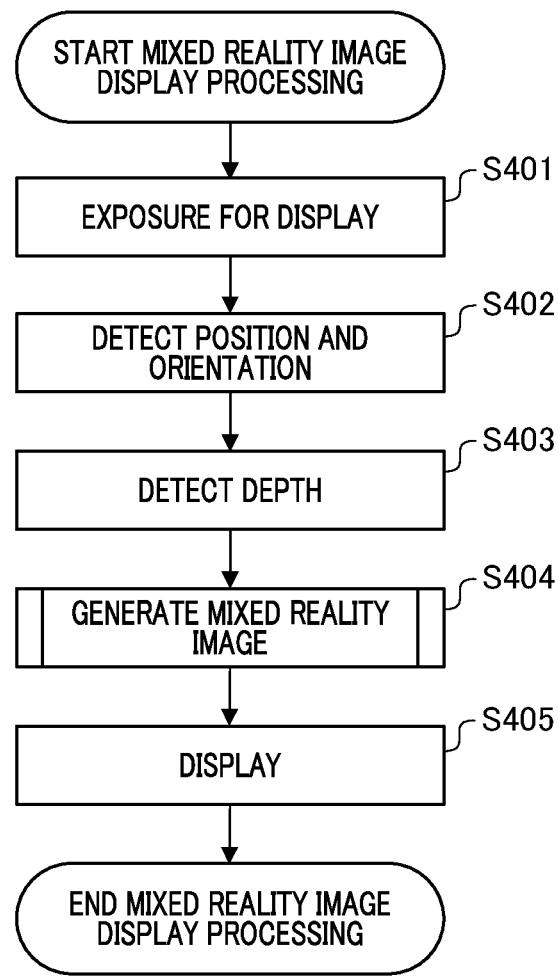
FIG. 4 is a flowchart that explains an example of the display processing of the mixed reality image.

FIG. 4 is a flowchart that explains an example of the display processing of the mixed reality image in S202 in FIG. 2. Each process according to this flowchart is realized by the CPU 117 executing a control program stored in the memory 118. In FIG. 4, the symbol "S" indicates a step number corresponding to each process according to this flowchart.

In S401, the CPU 117 performs exposure processing for display at a cycle corresponding to a predetermined display rate and acquires a signal for the captured image from the imaging element 106. Subsequently, in S402, the position and orientation detection unit 119 detects the position and orientation of the image capturing apparatus 100 and outputs the position and orientation information. The CPU 117 stores the position and orientation information that is output by the position and orientation detection unit 119 in the storage unit (for example, memory 118) in association with the signal acquired in S401.

Next, in S403, the CPU 117 detects a depth of space within a shooting field angle and acquires depth information. The CPU 117 stores the acquired depth information in a storage unit (for example, the memory 118) in association with the signal that is acquired in S401. Subsequently, in S404, the CPU 117 controls the real image generation unit 107 to execute the generation processing of the mixed reality image. In S405, the CPU 117 shapes the mixed reality image that is generated in S404 to a size suitable for display and controls the display unit 110 to provide a live-view display of the shaped mixed reality image.

Figure 5:
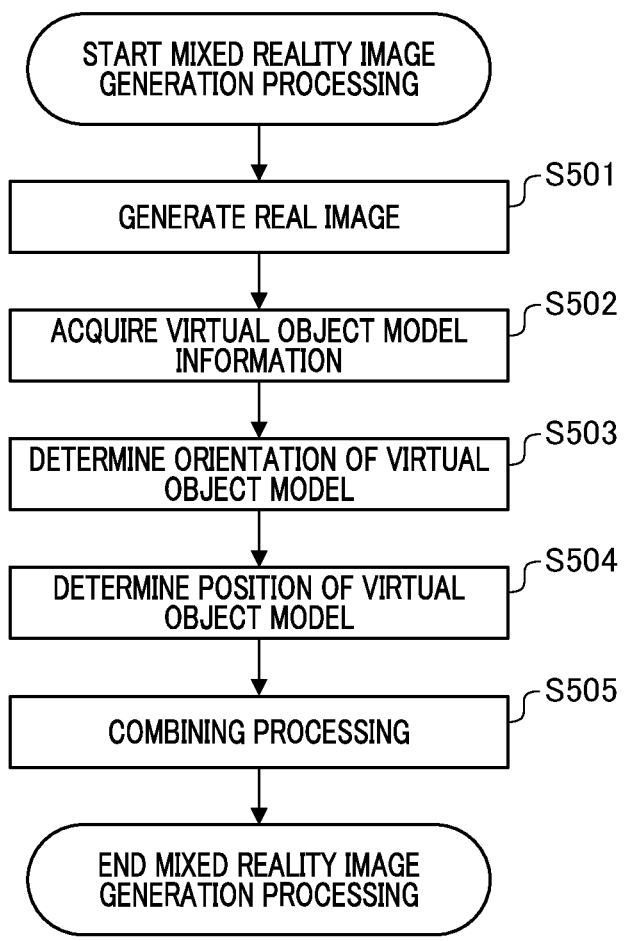
FIG. 5 is a flowchart that explains an example of the generating processing of the mixed reality image.

FIG. 5 is a flowchart that explains an example of the generation processing of the mixed reality image in S404 in FIG. 4. Each process according to this flowchart is realized by the CPU 117 executing a control program stored in the memory 118. In FIG. 5, the symbol "S" indicates a step number corresponding to each process according to this flowchart.

In S501, the real image generation unit 107 performs development processing on the signal for the captured image obtained by the display exposure in S401 in FIG. 4 and generates an image of the real space. Subsequently, in S502, the mixed reality image generation unit 109 acquires information about the arrangement position of the virtual object model in the real space (arrangement position information). For example, if a system is used in which a mixed reality space is constructed by recognizing a marker serving as a reference for arrangement of the virtual object model in the real space, the mixed reality image generation unit 109 acquires the information about the arrangement position of the virtual object model in the real space, based on the detection information of the marker within the shooting field angle. The mixed reality image generation unit 109 stores the acquired arrangement position information in a storage unit (for example, the memory 118) in association with a signal for the captured image. When the virtual object is not arranged in the real space, there is no information about the arrangement position of the virtual object. In this case, the mixed reality image generation unit 109 stores information indicating that there is no arrangement of the virtual object in the real space in the storage unit.

Next, in S503, the mixed reality image generation unit 109 determines the shape of the virtual object model as viewed from the image capturing apparatus 100, in other words, the orientation of the virtual object model, by using the position and orientation information stored in the memory 118 in association with the signal for the captured image. Subsequently, in S504, the mixed reality image generation unit 109 determines the size of the virtual object model as viewed from the image capturing apparatus 100, based on the depth information corresponding to the arrangement position of the virtual object model. In S505, the mixed reality image generation unit 109 projects (renders) the virtual object model viewed from the image capturing apparatus 100 by superimposing it on the real image. Thus, the image of the real space and the image of the virtual object are combined to generate a mixed reality image.

Figure 6:
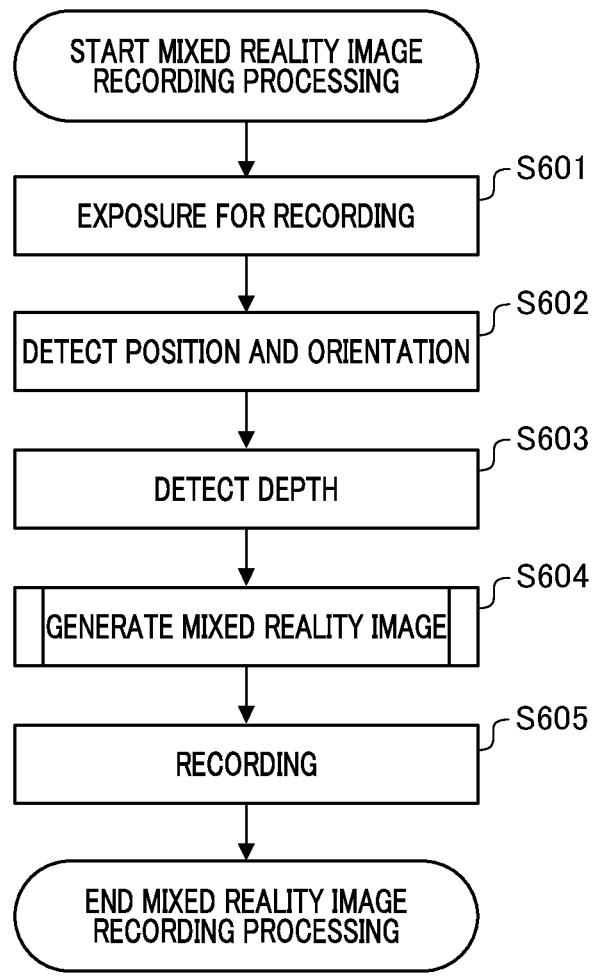
FIG. 6 is a flowchart that explains an example of the recording processing of the mixed reality image.

FIG. 6 is a flowchart that explains an example of the recording processing of the mixed reality image in S208 in FIG. 2. Each process according to this flowchart is realized by the CPU 117 executing a control program stored in the memory 118. In FIG. 6, the symbol "S" indicates a step number corresponding to each process according to this flowchart.

In S601, the CPU 117 performs exposure for recording based on the stop value and shutter speed set by the exposure control in S206 in FIG. 2. The processes from S602 to S604 are the same as those from S402 to S404 in FIG. 4. By the processes from S602 to S604, the image of the real space captured by the exposure for recording and the image of the virtual object are combined to generate a mixed reality image. In S605, the mixed reality image generation unit 109 records the mixed reality image generated in S604 in the recording unit 111. In the image processing apparatus according to the first embodiment described above, the image of the real space obtained by image capturing according to the exposure control based on the motion amount of the target including a virtual object is combined with the image of the virtual object. Consequently, it is possible to obtain a mixed reality image with a decreased sense of incongruity in which the motion of the virtual object is reflected.

Second Embodiment

In the image processing apparatus according to the second embodiment, a plurality of exposures are performed based on the motion amount of the target including a virtual object described in the first embodiment, and a mixed reality image is generated based on the image information obtained by image capturing according to each exposure (divided exposure). The number of times of divided exposures is obtained by dividing the exposure time corresponding to a predetermined shutter speed by the exposure time determined by the exposure control based on the motion amount of the target including the virtual object that was described in the first embodiment. Consequently, a recorded image corresponding to a predetermined shutter speed is obtained. Hereinafter, an image of the real space obtained by image capturing using divided exposure is also referred to as "a divided exposure image".

The overall operation for shooting the mixed reality space in the second embodiment is the same as the overall operation for shooting the mixed reality space in the first embodiment that has been described with reference to FIG. 2, other than the processes of S206 and S208. Hereinafter, the differences from the first embodiment will be described. The exposure control in the second embodiment will be described. In S206 in FIG. 2, as in the first embodiment, the exposure controller 116 first sets the exposure conditions so that the image blur caused by the motion of the target is minimized based on the motion amount of the target including a virtual object that is output from the motion amount calculation unit 114. Thus, the exposure time corresponding to the set exposure conditions (first exposure time) is determined.

In the second embodiment, the exposure controller 116 further acquires an exposure time corresponding to a preset shutter speed (second exposure time). Subsequently, the exposure controller 116 divides the second exposure time by the first exposure time to calculate the number of times of divided exposures. In the recording processing of the mixed reality image to be described below, a signal for the captured image corresponding to the second exposure time can be obtained by performing divided exposure for the calculated number of times. When the first exposure time is shorter than the second exposure time, the number of times of divided exposures is two or more times. When the first exposure time is longer than the second exposure time, the exposure controller 116 sets the first exposure time to the second exposure time and sets the number of times of divided exposures to 1. The calculated number of times of divided exposures (the number of times of exposure repetitions) is referred to in the recording processing of the mixed reality image.

FIG. 7 is a flowchart that explains an example of the recording processing of the mixed reality image in S208 in FIG. 2 according to the second embodiment. Each process according to this flowchart is realized by the CPU 117 executing a control program stored in the memory 118. In FIG. 7, the symbol "S" indicates a step number corresponding to each process according to this flowchart. The step numbers that are the same as those in FIG. 6 are provided to the processes that are the same as those described with reference to FIG. 6 and descriptions thereof will be omitted.

When the recording processing of the mixed reality image starts, the process proceeds to S701. In S701, the CPU 117 initializes the number of times of exposures to 0. Subsequently, in S702, the CPU 117 performs exposure by using the first exposure time (divided exposure). Then, the divided exposure image and the image of the virtual object are combined by a series of processes from S602 to S604, and a mixed reality image corresponding to the first exposure time is generated. Subsequently, in S703, the CPU 117 increments the number of times of exposures. In S704, the CPU 117 determines whether or not the number of times of exposures has reached the number of times of exposure repetitions. If the number of times of exposures has not reached the number of times of exposure repetitions, the process proceeds to S702. Subsequently, the next divided exposure and the generation processing of the mixed reality image are executed. When the number of times of exposures has reached the number of times of exposure repetitions, mixed reality images for the number of times of exposure repetitions have already been generated. In this case, the process proceeds to S705.

In S705, the mixed reality image generation unit 109 generates a single combined mixed reality image by combining the mixed reality images for the number of times of exposure repetitions by using an image processing circuit (not illustrated). The generated combined mixed reality image includes an image signal of a second exposure time, that is, an exposure time corresponding to a shutter speed for recording. Additionally, since the information for the virtual object having the same time axis is superimposed at each exposure time, the image blur caused by the motion of the virtual object is reproduced on the combined image. In S706, the mixed reality image generation unit 109 records the combined mixed reality image in the recording unit 111. Then, the process ends. The image processing apparatus according to the second embodiment described above performs divided exposure processing based on the first exposure time in which image blur caused by the motion of the target is small when shooting is performed at a fixed shutter speed. Therefore, in the image processing apparatus according to the second embodiment, it is possible to suppress the deterioration of the alignment accuracy of the marker in the generation processing of the mixed reality image and to reproduce an image blur caused by the motion of the virtual object in the recorded image.

Third Embodiment

An image processing apparatus according to the third embodiment combines a plurality of images of a real space obtained by a plurality of divided exposures, and performs the rendering of a virtual object model that is corrected according to the motion amount of the virtual object that is superimposed on the obtained combined image of the real space.

FIG. 8 is a flowchart that explains an example of the recording processing of a mixed reality image performed by the image processing apparatus according to the third embodiment. Each process according to this flowchart is realized by the CPU 117 executing a control program stored in the memory 118. In FIG. 8, the symbol "S" indicates a step number corresponding to each process according to this flowchart. The overall operation for the shooting of the mixed reality space according to the third embodiment is the same as the operation described with reference to FIG. 2.

In S801, as in the second embodiment, the CPU 117 acquires an image of the real space by divided exposure (divided exposure image). Subsequently, the CPU 117 determines whether or not there is an arrangement of a virtual object model for the divided exposure image, in other words, whether or not a virtual object is included in the object corresponding to the divided exposure. If there is no arrangement of the virtual object model for the divided image, the process returns to S801. If there is an arrangement of the virtual object model for the divided exposure image, the process proceeds to S803. The processes from S801 and S802 are performed the same number of times as the exposure repetitions.

Next, in S803, the CPU 117 acquires the motion amount of the virtual object included in the target corresponding to each divided exposure. Subsequently, the CPU 117 integrates the acquired motion amount of the virtual object to acquire a motion amount of the virtual object corresponding to a plurality of exposures (the number of times of exposure repetitions), that is, a motion amount of the virtual object corresponding to the second exposure time.

Next, in S804, the CPU 117 combines a plurality of divided exposure images that are obtained by the exposure corresponding to the number of times of exposure repetitions. Accordingly, an image of the real space corresponding to the second exposure time is obtained. Subsequently, in S805, the CPU 117 determines the position, orientation, and the depth of the virtual object model to be arranged on the image of the real space.

Next, in S806, the CPU 117 executes correction processing according to the amount of motion of the virtual object corresponding to the exposures for the number of times of exposure repetitions acquired in S803 on the image of the virtual object to be arranged. Specifically, the CPU 117 applies motion blur to the image of the virtual object.

Next, in S807, the CPU 117 combines the image of the real space obtained in the combining processing in S804 and the image of the virtual object to which correction processing has been performed in S806. Thus, a mixed reality image is generated. In S808, the CPU 117 records the generated mixed reality image in the recording unit 111. According to the image processing apparatus in the third embodiment, it is possible to generate a mixed reality image by combining the image of the real space and the image of the virtual object once while suppressing image blur caused by divided exposure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-014184, filed Feb. 1, 2021, which is hereby incorporated by reference wherein in its entirety.

What is claimed is:

1. An image capturing apparatus comprising:
an image capturing sensor configured to obtain an image by photoelectrically converting an object light;
at least one processor and memory holding a program which makes the processor function as:
an acquisition unit configured to acquire a motion amount of a target including a virtual object;
a controller configured to perform exposure control based on a photometry result and the acquired motion amount; and
a generation unit configured to generate a combined image by combining an image of a real space captured by the exposure control with an image of the virtual object,
wherein the controller executes a plurality of exposures based on an exposure time determined by exposure control performed based on the motion amount,
wherein the acquisition unit acquires a motion amount of the virtual object corresponding to the plurality of exposures based on a motion amount of a target corresponding to each exposure, and
wherein the generation unit combines the images of the real space obtained by the image capturing from each exposure and combines the obtained combined image of the real space with an image of the virtual object to which correction processing according to the obtained motion amount of the virtual object has been performed.

2. An image processing apparatus comprising:
at least one processor and memory holding a program which makes the processor function as:
an acquisition unit configured to acquire a motion amount of a target including a virtual object;
a controller configured to perform exposure control based on a photometry result and the acquired motion amount; and
a generation unit configured to generate a combined image by combining an image of a real space captured by the exposure control and an image of the virtual object,
wherein the controller executes a plurality of exposures based on an exposure time determined by exposure control performed based on the motion amount,
wherein the acquisition unit acquires a motion amount of the virtual object corresponding to the plurality of exposures based on a motion amount of a target corresponding to each exposure, and
wherein the generation unit combines the images of the real space obtained by the image capturing from each exposure and combines the obtained combined image of the real space with an image of the virtual object to which correction processing according to the obtained motion amount of the virtual object has been performed.

3. The image processing apparatus according to claim 2, wherein the controller executes a plurality of exposures based on an exposure time determined by the exposure control, and
wherein the generation unit combines an image of the real space obtained by the image capturing from each exposure and the image of the virtual object to generate a plurality of the combined images, and combines the generated combined images.

4. The image processing apparatus according to claim 3, wherein the controller executes exposures for the number of times obtained by dividing an exposure time according to a preset shutter speed by an exposure time determined by exposure control performed based on the amount of motion.

5. The image processing apparatus according to claim 2, wherein the acquisition unit acquires a motion amount of the virtual object corresponding to the plurality of exposures by integrating a motion amount of the virtual object that is included in the target for each exposure.

6. The image processing apparatus according to claim 2, wherein the acquisition unit acquires a motion amount of the virtual object included in the target based on a virtual object model including position information of the virtual object in a time axis direction stored in a storage unit; and
wherein the controller determines the exposure time based on the acquired motion amount of the virtual object.

7. The image processing apparatus according to claim 2, wherein the generation unit combines the image of the real space with the image of the virtual object based on information about a arrangement position of the virtual object model in the real space obtained based on detection information of a marker within a shooting field angle.

8. A control method of an image processing apparatus, comprising:
acquiring a motion amount of a target including a virtual object;
performing exposure control based on a photometry result and the acquired motion amount;
generating a combined image by combining an image of a real space captured by the exposure control and an image of the virtual object;
executing a plurality of exposures based on an exposure time determined by exposure control performed based on the motion amount;
acquiring a motion amount of the virtual object corresponding to the plurality of exposures based on a motion amount of a target corresponding to each exposure; and
combining the images of the real space obtained by the image capturing from each exposure and combines the obtained combined image of the real space with an image of the virtual object to which correction processing according to the obtained motion amount of the virtual object has been performed.

9. An image processing apparatus comprising:
at least one processor and memory holding a program which makes the processor function as:
an acquisition unit configured to acquire a motion amount of a target; and
a generation unit configured to generate a combined image using an image of a virtual object different from the target and at least one image obtained by capturing the target,
wherein the combined image includes the virtual object in which blur occurs according to the motion amount of the target.

10. The image processing apparatus according to claim 9, the generation unit applies motion blur according to the motion amount of the target to the image of the virtual object, and combines the image of the virtual object to which motion blur has been applied and at least one image obtained by capturing the target to generate the combined image.

11. The image processing apparatus according to claim 10, the generation unit combines the image of the virtual object to which motion blur has been applied and a plurality of images obtained by capturing the target to generate the combined image.

12. The image processing apparatus according to claim 9, the generation unit generates a plurality of mixed images by combining each of the images obtained by capturing the target and the image of the virtual object, and generates the combined image by combining the plurality of mixed images into a single image.

13. The image processing apparatus according to claim 12, the generation unit generates a plurality of mixed images so that the image of the virtual object is arranged at a position of a marker included in each of the images obtained by capturing the target.

14. The image processing apparatus according to claim 9, the acquisition unit acquires the motion amount of the target based on a plurality of images obtained by capturing the target.

15. A control method of an image processing apparatus comprising:
acquiring a motion amount of a target; and
generating a combined image using an image of a virtual object different from the target and at least one image obtained by capturing the target,
wherein the combined image includes the virtual object in which blur occurs according to the motion amount of the target.

* * * * *